United States Patent

Wodka

[11] Patent Number: 5,316,247
[45] Date of Patent: May 31, 1994

[54] WIRE-AND-TUBE-RETAINING POLE CLIP

[75] Inventor: Michael A. Wodka, Ann Arbor, Mich.

[73] Assignee: Minnesota Mining and Manufacturing Company, St. Paul, Minn.

[21] Appl. No.: 907,156

[22] Filed: Jul. 1, 1992

[51] Int. Cl.$^5$ .............................................. F16L 3/22
[52] U.S. Cl. ................................. 248/073; 248/68.1
[58] Field of Search ............... 248/68.1, 72, 73, 231.8

[56] References Cited

U.S. PATENT DOCUMENTS

| D. 270,329 | 8/1983 | Hardy | D 8/395 |
|---|---|---|---|
| 1,816,301 | 7/1931 | Sundell . | |
| 2,372,683 | 4/1945 | Robertson | 248/74.3 |
| 2,696,963 | 12/1954 | Shepherd | 248/229 |
| 3,090,826 | 5/1963 | Cochran | 248/68.1 X |
| 3,136,515 | 6/1964 | Potruch | 248/68.1 X |
| 3,251,069 | 5/1966 | Clark | 4/144.1 |
| 3,322,381 | 5/1967 | Bubb | 248/121 |
| 3,521,332 | 7/1970 | Kramer | 403/188 |
| 3,594,682 | 7/1971 | Oleson | 439/100 |
| 3,778,537 | 12/1973 | Miller | 174/229 |
| 3,853,021 | 12/1974 | Hayes | 74/568 R |
| 4,406,042 | 9/1983 | McPhee | 24/130 |
| 4,511,164 | 4/1985 | Orchard | 285/252 |
| 4,673,153 | 6/1987 | Hilty et al. | 248/231.8 |
| 4,707,906 | 11/1987 | Posey | 29/453 |
| 4,715,571 | 12/1987 | Soltow et al. | 248/68.1 |
| 4,864,697 | 9/1989 | Sparks et al. | 24/336 |
| 4,896,465 | 1/1990 | Rhodes et al. | 51/391 |
| 4,958,791 | 9/1990 | Nakamura | 248/68.1 X |
| 5,005,793 | 4/1991 | Shillington | 248/229 |

FOREIGN PATENT DOCUMENTS 0046905 5/1969 France .................. 248/68.1

OTHER PUBLICATIONS

Sarns 9000 Perfusion System "Touch the Vision" brochure which includes brochures entitled Focus on Your Patient; Universal Roller Pump; Safeguard Your Patient; Discover Simplicity and a sheet of specifications; publication date unknown; copyrights 1988, 1989, and 1991.

Sarns "Touch and Record Information System" brochure; publication date unknown; copyright 1989.

Sarns MDX System "Quality and Reliability in a Modular System" brochure; publication date unknown; copyright 1990.

Sarns TCM II brochure; publication date unknown; copyright 1989.

Primary Examiner—Richard K. Seidel
Assistant Examiner—Raymond D. Woods
Attorney, Agent, or Firm—Gary L. Griswold; Walter N. Kirn; Stephen W. Bauer

[57] ABSTRACT

A pole clip for arranging wires and/or tubing around the circumference of a pole. The clip comprises a resilient, flexible, generally C-shaped body adapted for a snap fit on the pole, and at least one resiliently-flexible arcuate arm extending in generally concentric relationship relative to the C-shaped body. The arm defines an arcuate wire-and-tube-retaining area between the C-shaped body and the arm. The wire-and-tube-retaining area is concentric with the C-shaped body, and is configured to visibly retain wires and/or tubes in side-by-side relationship around the pole. The arm has a free end closely spaced from another portion of the clip such that wires and/or tubes can be manually introduced into or released from the wire-and-tube-retaining area by flexing the arcuate arm but the arm normally retains the wires and/or tubes.

23 Claims, 2 Drawing Sheets

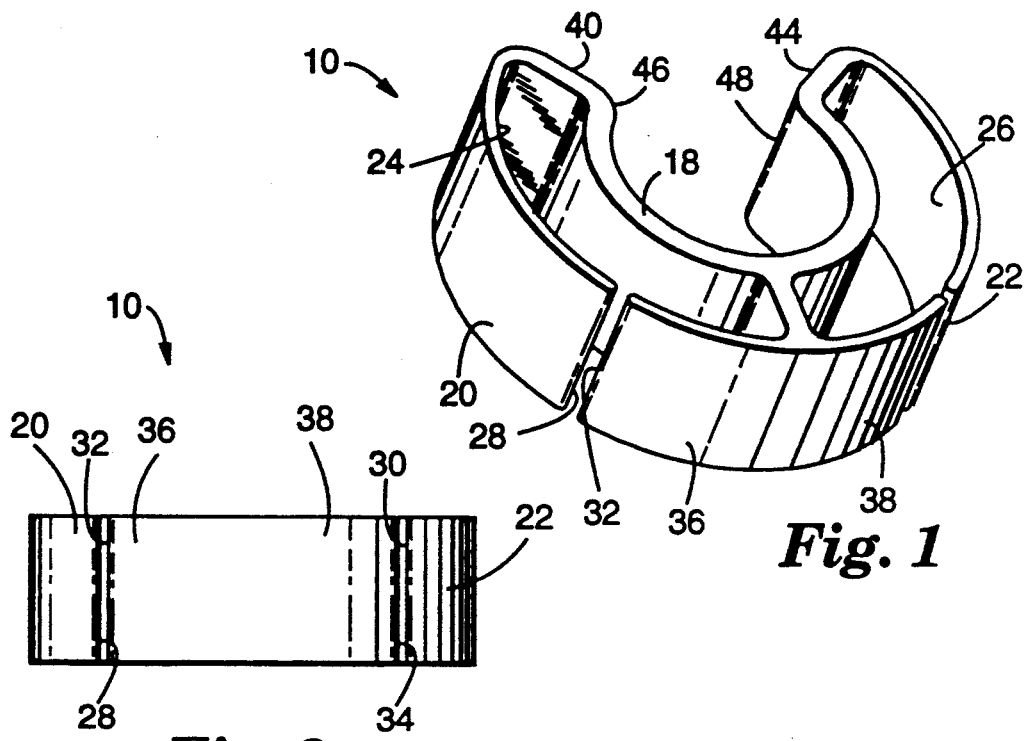
*Fig. 1*
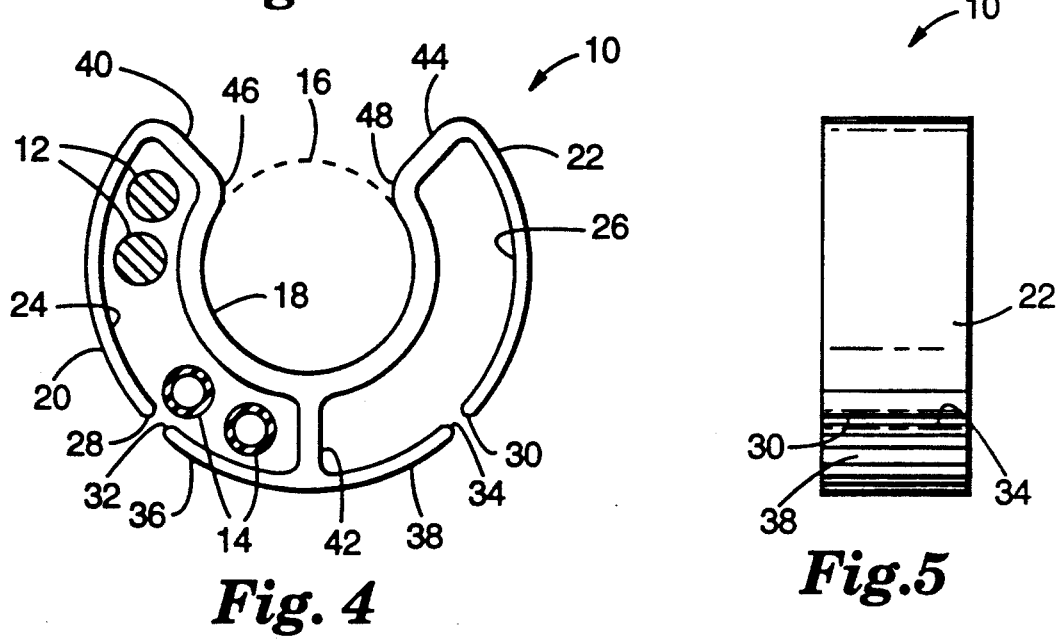
*Fig. 2*
*Fig. 4*
*Fig.5*
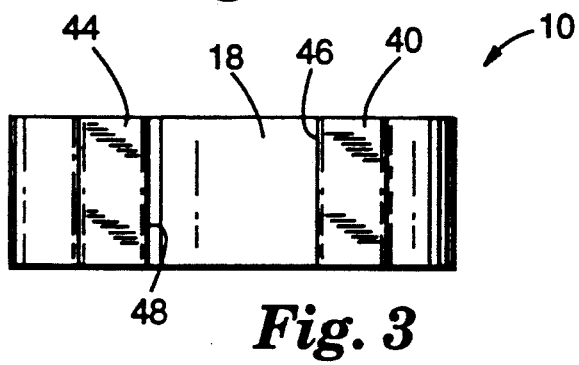
*Fig. 3*

WIRE-AND-TUBE-RETAINING POLE CLIP

This invention relates to clips for holding wires or tubing, and in particular to such a clip for retaining wires and/or tubing on a pole.

BACKGROUND OF THE INVENTION

Medical wiring and tubing are commonly tied to poles with plastic tie strips. The tie strips have an undulating surface along their length, and a small opening at one end through which the other end of the strap is introduced. The small opening includes a spring mechanism that interacts with the undulating surface to provide a rachet mechanism permitting tightening the strap around the wires, tubing and pole but which cannot be released. Frequently, the wires and tubing are clamped by the strap over one another so that it becomes difficult to follow any one wire or tube, and replacement of a single wire may require cutting the strap and using a new strap to tie the wires and tubing back on the pole.

The shortcomings of the conventional tie strap described above have been particularly noticeable when used in the medical environment, in particular when used in connection with complicated extracorporeal heart/lung equipment and patient monitoring equipment. This equipment requires a multiplicity of wires and tubing, some of which is used on a semi-permanent basis for more than one surgery and some of which is disposable between surgeries. It can be difficult to determine which tie straps need to be cut to remove some wires or tubes without removing others. Moreover, visual inspection of the wires and tubing before or during surgery is difficult when they are clamped over one another by the tie strap.

U.S. Pat. No. 4,896,465 (Rhodes et al.) describes a retainer apparatus including a pair of sponges mounted between a pair of supports, which can be connected by hinges, for securing devices or objects. That apparatus includes a flexible strap for mounting on a pole or other object.

U.S. Pat. No. 3,251,069 (Clark) discloses an inlet tube stabilizer for a flexible container, such as a plastic bedside drainage container, on a bed member or other support. That stabilizer comprises a strap having a gripper member including spaced apart lips forming enclosures of different diameters for retaining tubes of different sizes.

U.S. Pat. No. 5,005,793 (Shillington) relates to a pole clip needle cap holder which can be mounted on an IV support pole for holding one or more tubes close to the IV pole.

U.S. Pat. No. 3,797,792 (Huber) discloses clamping means for physiological fluid infusion systems, and U.S. Pat. No. 2,696,963 (Shepherd) discloses a portable intravenous fluid carrier.

U.S. Pat. Nos. 2,372,683; 3,322,381; 3,521,332; 3,594,682; 3,778,537; 4,406,042; 4,673,153 and 4,864,697 show wire or tubing clips, or other retaining devices.

SUMMARY OF THE INVENTION

This invention provides a pole clip for arranging wires and/or tubing around the circumference of a pole, in particular for arranging wires and medical tubing around a pole used in an operating room in which efficient use of space is of great importance. The clip is particularly designed to visibly retain the wire and/or tubing in side-by-side relationship around the pole to maintain an efficient and more readily understandable organization of such wiring and tubing. The clip also holds the wires and tubing in a manner which is believed to reduce the risk o inadvertently disconnecting the wires and tubes, or kinking the tubing. The invention also permits selectively replacing tubing and wiring without destroying or detaching the clip from the pole.

Generally, the clip comprises a resilient, flexible, generally C-shaped body adapted for a snap fit on the pole, and at least one resiliently-flexible arcuate arm extending in generally concentric relationship relative to the C-shaped body. The arcuate arm defines an arcuate wire-and-tube-retaining area between the C-shaped body and the arm. The wire-and-tube-retaining area is concentric with the C-shaped body, and is adapted to closely receive wires and/or tubes such that the wires and/or tubes are visibly retained in side-by-side relationship around the pole. The arm has a free end closely spaced from another portion of the clip such that wires and/or tubes can be manually introduced into or released from the wire-and-tube-retaining area by flexing the arcuate arm but the arm normally retains the wires and/or tubes.

Preferably, a second arcuate arm is also provided extending in generally concentric relationship relative to the C-shaped body. The second arm has a free end closely spaced from the free end of the other (first) arm to further define the wire-and-tube-retaining area between the C-shaped body and the first and second arms. The second arm may conveniently have a length of approximately one-half the length of the first arm, the first arm being substantially more flexible than the second arm.

Optionally, the clip may be provided with one or more additional resiliently-flexible arcuate (first) arms extending in generally concentric relationship relative to the C-shaped body, with the additional arcuate arms defining additional arcuate wire-and-tube-retaining area(s) between the C-shaped body and the arms. Each such arm has a free end closely spaced from another portion of the clip such that wires and/or tubes can be introduced into or released from the wire-and-tube-retaining area defined by that arm by flexing the arm.

Preferably, the clip also includes at least one radially extending bridging portion extending generally radially outwardly from the C-shaped body, with the arm extending in generally concentric relationship with the C-shaped body from the radially outward ends of a bridging portion. The bridging portion defines the width of the wire-and-tube-retaining area.

The C-shaped body is preferably substantially stiffer than the arm. For example, the C-shaped body, bridging portion(s) and arcuate arm(s) may be integrally molded of thermoplastic or thermoset material (e.g., acetal copolymer or polycarbonate resin), and the C-shaped body may have a cross-sectional area approximately 150–250 percent larger than the cross-sectional area of the arm. The C-shaped body most preferably extends along about 270 degrees of its radius of curvature.

Other features will be pointed out hereinafter.

BRIEF DESCRIPTION OF THE DRAWING

The invention will be further described with reference to the drawing wherein corresponding reference characters indicate corresponding parts throughout the several views of the drawing, and wherein:

FIG. 1 is a perspective view of the wire-and-tube-retaining clip of the invention;

FIG. 2 is front view of the clip of FIG. 1;

FIG. 3 is a back view of the clip of FIGS. 1 and 2;

FIG. 4 is a top plan of the clip of FIGS. 1-3, illustrating the clip mounted on a pole and wires and tubes retained in the clip;

FIG. 5 is a right side view of the clip of FIGS. 1-4;

DETAILED DESCRIPTION OF A PREFERRED EMBODIMENT

Figure 6:
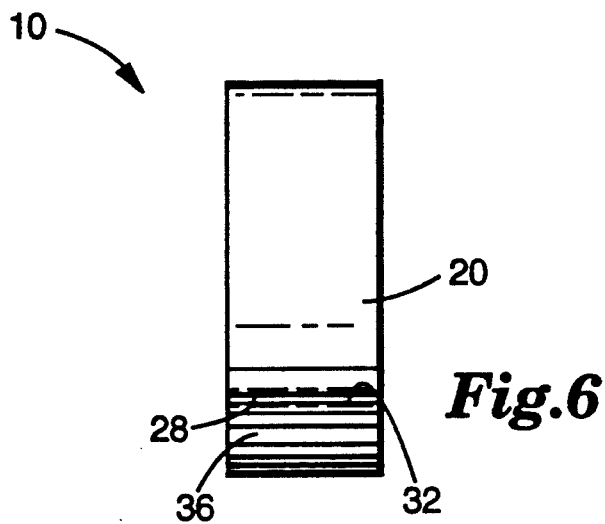
FIG. 6 is a left side view of the clip of FIGS. 1-5.

Now referring to the drawing, a pole clip of the invention is designated in its entirety by the reference numeral 10. The pole clip 10 is particularly adapted for arranging wires 12 and/or tubing 14 around the circumference of a pole 16. The clip 10 is believed to be particularly advantageous in organizing wires 12 and tubing 14 used in cardiovascular surgery involving fairly complicated machinery and a multiplicity of interconnected tubes and wires.

The clip 10 comprises a resilient, flexible, generally C-shaped body 18 adapted for a snap fit on the pole 16, and at least one resiliently-flexible arcuate (first) arm (preferably two such "first" arms 20 and 22) extending in generally concentric relationship relative to the C-shaped body 18. Each first arm 20 and 22 defines an arcuate wire-and-tube-retaining area 24 and 26 between the C-shaped body 18 and the first arm 20 or 22. The wire-and-tube-retaining areas 24 and 26 are concentric with the C-shaped body 18, and are adapted to closely receive wires 12 and/or tubes 14 such that the wires 12 and/or tubes 14 are visibly retained in side-by-side relationship around the pole 16. The free end 28 or 30 of each first arm 20 and 22 is closely spaced from another portion of the clip 10 (e.g., the free end 32 or 34 of one of the second arms 36 or 38). The arrangement is such that wires 12 and/or tubes 14 can be manually introduced into or released from the wire-and-tube-retaining area 24, 26 by flexing the respective arcuate first arm 20 or 22 but the first arm 20 or 22 normally retains the wires 12 and/or tubes 14 in the wire-and-tube-retaining area 24 or 26.

Preferably, the clip 10 further includes radially extending bridging portions 40, 42 and 44 extending generally radially outwardly from the C-shaped body 18. The first and second arms 20, 22, 36 and 38 extend in generally concentric relationship with the C-shaped body 18 from the radially outward ends of the bridging portions 40, 42 and 44 such that the bridging portions 40, 42 and 44 define the width of the wire-and-tube-retaining areas 24 and 26 and the respective arms 20, 22, 36 and 38 define the length of the wire-and-tube-retaining areas 24 and 26.

The outer bridging portions 40 and 44 preferably diverge from one another in the direction away from the C-shaped body 18 so as to form a tapered opening to facilitate placing the clip 10 on the pole 16. The divergence of the outer bridging portions 40 and 44 helps to flex the C-shaped body 18 outwardly when the clip 10 is pushed against the pole 16.

Most preferably, the first arms 20 and 22 extend from the outward ends of the outside bridging portions 40 and 44 in the direction toward the outward end of the middle bridging portion 42, and both second arms 36 and 38 extend in opposite directions from the outward end of the middle bridging portion 42 toward the free ends 28 and 30 of their respective first arms 20 and 22. The arrangement is such that the clip 10 is generally symmetrical about a plane defined by the middle bridging portion 42.

Preferably, each second arm 36 and 38 is arcuate having a radius of curvature substantially equal to the radius of curvature of the first arms 20 and 22, and extends in generally concentric relationship relative to the C-shaped body 18. The free ends 32, 34 of the second arms 36 and 38 are closely spaced from the free end 28 or 30 of the respective first arm 20 or 22 to further define the wire-and-tube-retaining areas 24 and 26 between the C-shaped body 18 and the first and second arms 20 and 22. The second arms 36 and 38 most preferably extend along a common arc with the first arms 20 and 22 at a substantially equal distance from the C-shaped body 18 as the other arms.

Most preferably, the second arms 36 and 38 each have a length of approximately one-half the length of each of the first arm 20 and 22, and the first arms 20 and 22 are substantially more flexible than the second arms 36 and 38. For example, if the clip 10 extends along an arc of approximately 270 degrees, the first arms 20 and 22 may each extend along an arc of approximately 90 degrees and the second arms 36 and 38 may each extend along an arc of approximately 45 degrees. By forming the first and second arms 20, 22, 36 and 38 with the same cross-sectional area but with the first arms 20 and 22 being approximately twice as long as the second arms 36 and 38, it becomes substantially easier to flex the free ends 28 and 30 of the first arms 20 and 22 than to move the free ends 32 and 34 of the second arms 36 and 38.

The C-shaped body 18 is substantially stiffer than the first arms 20 and 22, which helps facilitate flexing the first arms 20 and 22 to release wires 12 and tubing 14 from the wire-and-tube-retaining areas 24 and 26 without inadvertently releasing the clip 10 from the pole 16. This may be accomplished by integrally molding the C-shaped body 18 and the first arms 20 and 22 of the same material, and providing the C-shaped body 18 with a cross-sectional area approximately 150-250 percent (e.g., 200 percent) larger than the cross-sectional area of the first arms 20 and 22. The cross-sectional areas of the bridging portions 40, 42 and 44 may conveniently be approximately the same as the cross-sectional area of the C-shaped body 18.

The C-shaped body 18, arms 20, 22, 36 and 38, and bridging portions 40, 42 and 44 are integrally molded of thermoplastic or thermoset material. Suitable materials include acetal co-polymer and polycarbonate resin, such as the polymeric material sold under the trade designation "DELRIN" by E.I. DuPont De Nemours & Company, Wilmington, Delaware. The clip 10 can be molded in a number of ways, such as injection molding, with one technique involving injection molding the clip 10 with the first and second arms 20, 22, 36 and 38 interconnected and cutting the clip 10 in a second operation to separate opposing first and second arms 20, 22, 36 and 38. As used herein, "integrally molding" refers to integrally molding into one continuous piece, as opposed to more than one part being mechanically fastened or glued to another part.

The C-shaped body 18 should extend along an arc greater than 180 degrees up to 360 degrees. It is important that the arc of the C-shaped body 18 be at least enough greater than 180 degrees to hold the clip 10 on the pole 16. Most preferably, the C-shaped body 18 extends along an arc of approximately 270 degrees. The arrangement should be such that the outer ends 46 and 48 of the C-shaped body 18 are normally spaced apart a distance less than the diameter of the pole 16 to help retain the clip 10 on the pole 16. The C-shaped body 18 can be flexed sufficiently to allow the outer ends 46 and 48 to pass around the pole 16 when the clip 10 is manually pushed or pulled relative to the pole 16.

The outside surfaces of the first and second arms 20, 22, 36 and 38 provide a suitable location for various indicia, such as indicia identifying which wires 12 or tubing 14 should be placed in the clip 10 or a particular wire-and-tube retaining area 24 or 26 of the clip 10. The indicia could also identify the source of the clip 10. Such indicia may advantageously be molded into the clip 10 during the injection molding process.

Figure 7:
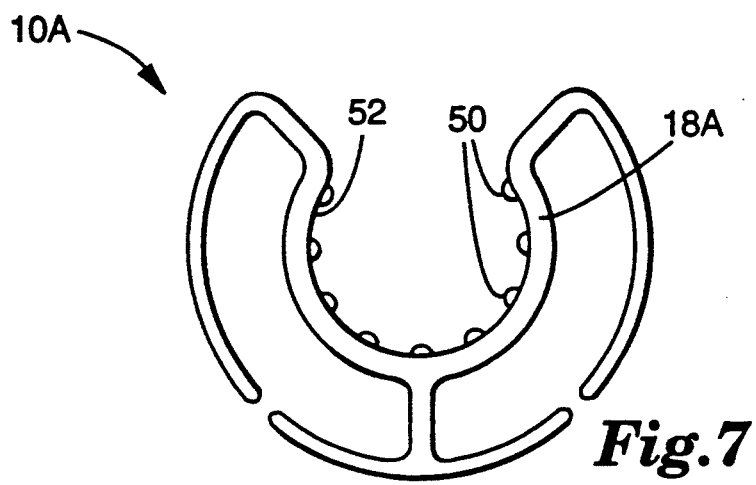
FIG. 7 is a top plan of an alternative embodiment of the clip of the invention.

FIG. 7 illustrates an alternative embodiment of the clip, here designated 10A, similar to clip 10 but with softer durometer gripping ribs 50 provided along the inner surface 52 of the C-shaped body 18A. The gripping ribs 50 may be formed of elastomeric material having a substantially softer durometer than the other portions of the clip 10A to increase the grip of the clip 10A on the pole 16.

Figure 8:
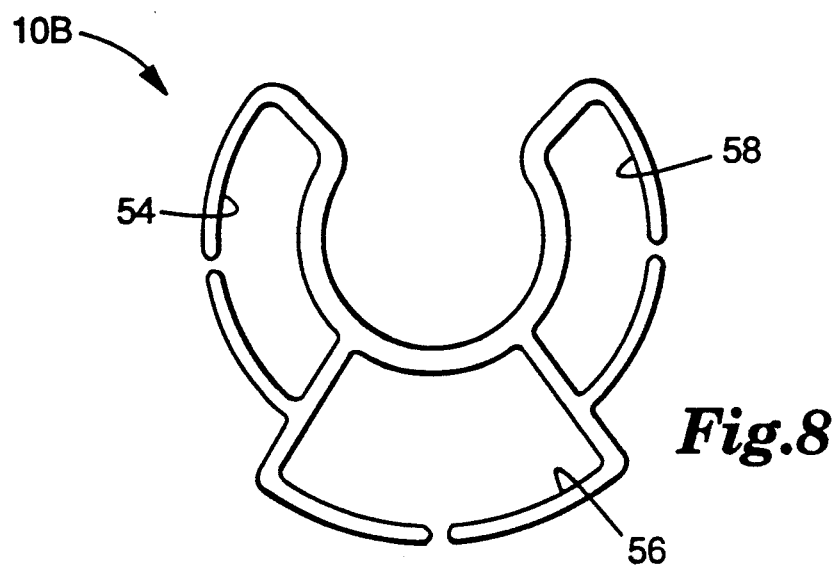
FIG. 8 is a top plan of yet another alternative embodiment of the clip of the invention.

FIG. 8 illustrates yet another alternative embodiment of the clip, here designated 10B, similar to clips 10 and 10A but with different size wire-and-tube-retaining areas 54, 56 and 58 to accommodate different sizes of wires and tubing. The narrower retaining areas 54 and 58 are adapted to closely receive relatively smaller diameter wire, and the wider retaining area 56 is adapted to closely receive relatively larger diameter wire and tubing.

OPERATION

The clip 10 may be mounted on a pole 16 of the type used to support medical equipment by pushing the C-shaped body 18 of the clip 10 unto the pole 16, with the body 18 providing a snap fit around the pole 16 to hold the clip 10 on the pole 16. Elongate members, such as wires 12 and tubing 14, may be introduced into the wire-and-tube-retaining area 24 and 26 by pushing or pulling the wires 12 and tubing 14 against the outside of one of the first arms 20 and 22 to flex the arm 20 or 22 so as to allow the wires 12 and/or tubing 14 to pass through the space between the free end 28 or 30 of the arm 20 or 22 and the free end 32 or 34 of the respective second arm 36 or 38.

The wires 12 and tubing 14 may be arranged in the wire-and-tube-retaining areas 24 and 26 such that they are visibly retained in side-by-side single-file relationship around the circumference of the pole 16. The width of the wire-and-tube-retaining areas 24 and 26 (the distance between the arms 29, 22, 36 and 38 and the C-shaped body 18) is sufficiently narrow that the wires 12 and tubing 14 is closely received in the wire-and-tube-retaining areas 24 and 26 so that no wires 12 or tubing 14 is laid over another wire 12 or tube 14. This single-file relationship facilitates inspection of the wires 12 and tubing 14 and reduces confusion.

After using the wires 12 and tubing 14 during medical or surgical treatment of a patient, the wires 12 and 14 may be removed by pulling or pushing them against the inside of the first arm 20 or 22 to flex the first arm 20 or 22 outwardly so as to allow the wires 12 and tubing 14 to pass through the space formed between the free end 28 or 30 of the first arm 20 or 22 and the free end 32 or 34 of the respective second arm 36 or 38. Depending upon the desired properties of the second arms 36 and 38, it may also be possible to remove or replace wires 12 and tubing 14 by flexing the second arm 36 and 38.

Of course, the clip 10 can also be used as a semi-permanent fixture on the pole 16, with wires 12 and tubing 14 being replaced solely on an as-needed basis. For example, retaining area 22 could be used to semi-permanently retain wires 12 used with medical monitoring or other equipment (not shown), and retaining area 24 could be used to retain disposable, one-use tubing 14 or wires 12 that are used during one surgery only.

The clip 10 may also find use outside of medical or surgical applications, wherever there is a need to organize and retain wires or tubing relative to a pole.

As various changes could be made in the above constructions and methods without departing from the scope of the invention, it is intended that all matter contained in the above description or shown in the accompanying drawing be interpreted as illustrative and not in a limiting sense.

I claim:

1. A pole clip for arranging wires and/or tubing around the circumference of a pole, the clip comprising:
   a resilient, flexible, generally C-shaped, generally arcuate body configured for a snap fit on the pole;
   at least one resiliently-flexible arcuate first arm extending in generally concentric relationship relative to the C-shaped body; and
   at least one arcuate second arm extending in generally concentric relationship relative to the C-shaped body;
   the first and second arms defining an elongate, arcuate wire-and-tube-retaining area between the C-shaped body and the arms, the wire-and-tube-retaining area being concentric with the C-shaped body and being elongate and arcuate to receive a plurality of wires and/or tubes such that the wires and/or tubes are visibly retained in side-by-side relationship around the pole, each arm having a free end closely spaced from the free end of the other arm such that wires and/or tubes are allowed to be manually introduced into or released from the wire-and-tube-retaining area by flexing the first arm but the arms normally retain the wires and/or tubes, the second arm defining an area for accommodating a wire or tube immediately after being pushed into the wire-and-tube-retaining area by flexing the first arm toward the C-shaped body.

2. A clip according to claim 1 wherein the second arm has a length of approximately one-half the length of the first arm, the first arm being substantially more flexible than the second arm.

3. A clip according to claim 1 further comprising one or more additional resiliently-flexible arcuate first arms extending in generally concentric relationship relative to the C-shaped body, and one or more additional arcuate second arms extending in generally concentric relationship relative to the C-shaped body, the additional arcuate first and second arms defining additional elongate, arcuate wire-and-tube-retaining area(s) between the C-shaped body and the additional arms, each additional first and second arm having a free end closely spaced from the free end of the other of said additional first and second arms such that wires and/or tubes are allowed to be introduced into or released from the wire-and-tube-retaining area defined by said additional first and second arms by flexing at least one of said additional first and second arms.

4. A clip according to claim 1 wherein the C-shaped body is substantially stiffer than the first arm.

5. A clip according to claim 4 wherein the arms each have a cross-sectional area, and the C-shaped body has a cross-sectional area approximately 150–250 percent larger than the cross-sectional area of either arm, the C-shaped body and the arms being integrally molded of thermoplastic or thermoset material.

6. A clip according to claim 5 wherein the material of the C-shaped body and the arms includes material selected from the group of acetal co-polymer and polycarbonate resin.

7. A clip according to claim 1 further comprising first and second radially extending bridging portions extending generally radially outwardly from the C-shaped body, the first and second arms extending in generally concentric relationship with the C-shaped body from the radially outward ends of the first and second bridging portions, respectively, the bridging portions defining a width of the wire-and-tube-retaining area.

8. A clip according to claim 7 wherein the C-shaped body, the arms and the bridging portions are integrally molded of thermoplastic or thermoset material.

9. A clip according to claim 1 wherein the C-shaped body extends along an arc of greater than approximately 180 degrees up to approximately 360 degrees.

10. A clip according to claim 9 wherein the C-shaped body extends along an arc of approximately 270 degrees.

11. A system for conveniently organizing wires and/or tubes around a pole, the system comprising:
a generally cylindrical pole;
a plurality of elongate members, and
a clip comprising a resilient, flexible, generally C-shaped body configured for a snap fit on the pole, and at least one resiliently-flexible arcuate arm extending in generally concentric relationship relative to the C-shaped body, the arm defining an elongate, arcuate wire-and-tube-retaining area between the C-shaped body and the arm, the wire-and-tube retaining area being concentric with the C-shaped body and closely receiving the elongate members such that the elongate members are visibly retained in side-by-side concentric relationship around the pole, the arm having a free end closely spaced from another portion of the clip such that elongate members are allowed to be manually introduced into or released from the wire-and-tube-retaining area by flexing the arm and the arm normally retains the elongate members.

12. A system according to claim 11 wherein the arm constitutes a first arm, the clip further comprising a second arcuate arm extending in generally concentric relationship relative to the C-shaped body and having a free end closely spaced from the free end of the first arm to further define the wire-and-tube-retaining area between the C-shaped body and the first and second arms.

13. A system according to claim 12 wherein the second arm has a length of approximately one-half the length of the first arm, the first arm being substantially more flexible than the second arm.

14. A system according to claim 11 further comprising one or more additional resiliently-flexible arcuate arms extending in generally concentric relationship relative to the C-shaped body, the additional arcuate arms defining additional elongate, arcuate wire-and-tube-retaining area(s) between the C-shaped body and the arms, each additional arm having a free end closely spaced from another portion of the clip such that wires and/or tubes are allowed to be introduced into or released from the wire-and-tube-retaining area defined by said each additional arm by flexing said each additional arm.

15. A system according to claim 11 further comprising at least one radially extending bridging portion extending generally radially outwardly from the C-shaped body, the arm extending in generally concentric relationship with the C-shaped body from the radially outward ends of the bridging portion, the bridging portion defining a width of the wire-and-tube-retaining area, the C-shaped body being substantially stiffer than the arm.

16. A system according to claim 15 wherein the arm has a cross sectional area, and the C-shaped body has a cross-sectional area approximately 150–250 percent larger than the cross-sectional area of the arm; the C-shaped body, the arm and the bridging portion being integrally molded of thermoplastic or thermoset material, the C-shaped body extending along an arc of greater than approximately 180 degrees up to approximately 360 degrees.

17. A pole clip for arranging wires and/or tubing around a pole, the clip comprising:
a resilient, flexible, generally C-shaped body having an outer side, and an inner side configured for a snap fit on the pole with the outer side facing away from the pole;
first and second bridging portions each extending outwardly from the C-shaped body to an outward end;
a resiliently-flexible, generally arcuate first arm on the outward end of the first bridging portion, the first arm extending toward the second bridging portion at a generally constant distance from the C-shaped body substantially throughout the length of the arm and terminating in a free end, the first arm being substantially less stiff than the C-shaped body; and
a generally arcuate second arm on the outward end of the second bridging portion extending in a direction toward the first arm and terminating in a free end closely spaced from the free end of the first arm;
the first and second arms defining a generally elongate, arcuate wire-and-tube-retaining area between the C-shaped body and the arms, the wire-and-tube-retaining area being sized and shaped to closely receive a plurality of wires and/or tubes such that the wires and/or tubes are visibly retained in side-by-side relationship along the periphery of the pole, and wires and/or tubes are allowed to be manually introduced into or released from the wire-and-tube-retaining area by flexing the first arm but the first and second arms normally retain the wires and/or tubes.

18. A clip according to claim 17 wherein the C-shaped body, the first arm, the second arm and the first and second bridging portions are integrally molded of thermoplastic or thermoset material.

19. A clip according to claim 18 wherein the second arm has a length of approximately one-half the length of the first arm, the first arm being substantially more flexible than the second arm.

20. A clip according to claim 19 wherein the C-shaped body is generally arcuate and the inner side of the C-shaped body is generally arcuate to adapt the C-shaped body for a snap fit on a cylindrical pole, the first and second arms being generally arcuate and concentric with the C-shaped body, the first and second arms being formed along a common arc.

21. A clip according to claim 18 further comprising:
a third bridging portion extending generally outwardly from the C-shaped body and having an outward end, with the first and third bridging portions being arranged on opposite sides of the second bridging portion;
a resiliently-flexible third arm on the outward end of the third bridging portion, the third arm extending toward the second bridging portion at a generally constant distance from the C-shaped body substantially throughout the length of the third arm and terminating in a free end, the third arm being substantially less stiff than the C-shaped body; and
a fourth arm on the outward end of the second bridging portion extending in a direction toward the third arm and terminating in a free end closely spaced from the free end of the third arm;
the third and fourth arms defining a second elongate wire-and-tube-retaining area between the C-shaped body and the third and fourth arms, the second wire-and-tube-retaining area being sized and shaped to closely receive a plurality of wires and/or tubes such that the wires and/or tubes are visibly retained in side-by-side relationship along the periphery of the pole, and the wires and/or tubes are allowed to be manually introduced into or released from the second wire-and-tube-retaining area by flexing the third arm but the third and fourth arms normally retain the wires and/or tubes.

22. A method of conveniently organizing elongate members around a pole, the method comprising:
providing a clip comprising resilient, flexible, generally C-shaped body, and at least one resiliently-flexible arcuate arm extending in generally concentric relationship relative to the C-shaped body, the arm having an outside, and an inside defining an elongate, arcuate wire-and-tube-retaining area between the C-shaped body and the arm, the wire-and-tube retaining area being concentric with the C-shaped body, the arm having a free end closely spaced form another portion of the clip;
pushing the C-shaped body unto the pole such that the body provides a snap fit around the pole to hold the clip on the pole;
introducing a plurality of said elongate members into the wire-and-tube-retaining area by pushing or pulling the elongate members against the outside of the arcuate arm to flex the arm inwardly toward the C-shaped body so as to allow the elongate members to pass through the space between the free end of the arm and the another portion of the clip;
arranging the plurality of elongate members in the wire-and-tube-retaining area such that the elongate members are closely received in the wire-and-tube-retaining space and are visibly retained in side-by-side concentric relationship around the pole;
using the elongate members during medical or surgical treatment of a patient; and
removing the elongate members after the medical or surgical treatment of the patient by pulling or pushing the elongate members against the inside of the arcuate arm to flex the arm outwardly so as to allow the elongate members to pass through the space formed between the free end of the arm and the another portion of the clip.

23. A method according to claim 22 wherein the arm constitutes a first arm, the clip further comprising a second arcuate arm extending in generally concentric relationship relative to the C-shaped body and having a free end closely spaced from the free end of the first arm to further define the wire-and-tube-retaining area between the C-shaped body and the first and second arms;
the step of introducing a plurality of elongate members into the wire-and-tube-retaining area comprising pushing or pulling the elongate members against the outside of the first arm to flex the first arm so as to allow the elongate members to pass through the space between the free end of the first arm and the free end of the second arm, with the second arm defining a portion of the wire-and-tube retaining area accommodating the elongate members as they are pushed past the first arm.

* * * * *